Dec. 27, 1932. W. MEREDITH 1,892,110
LEVEL VARIATION INDICATING APPARATUS
Filed Aug. 5, 1929
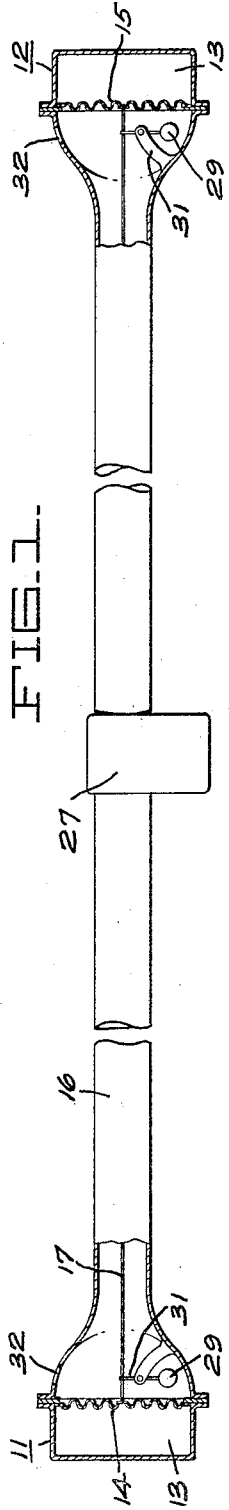
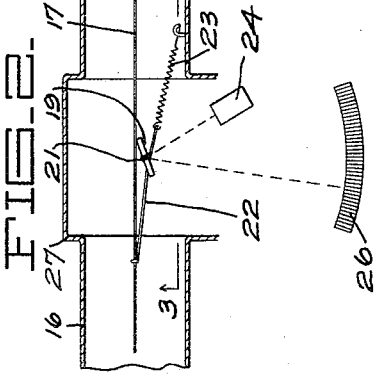
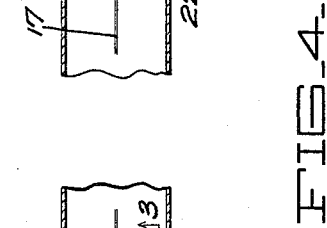
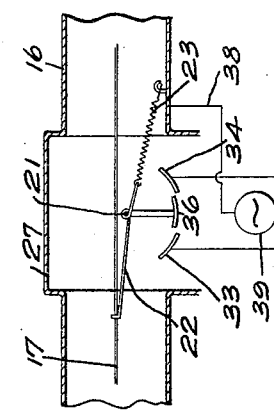
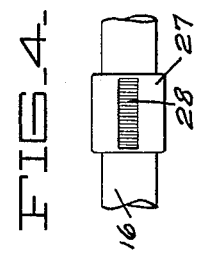
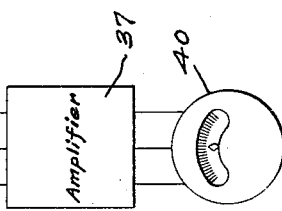
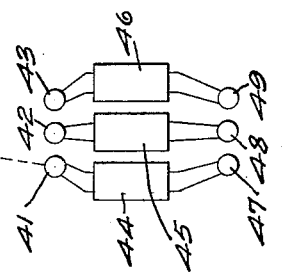
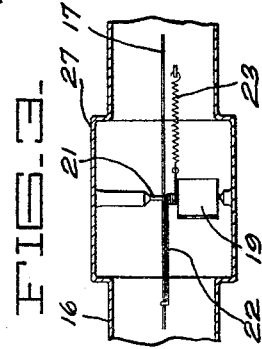
INVENTOR:
Wynn Meredith
BY
White, Prost, Fehr & Lothrop
ATTORNEYS.

Patented Dec. 27, 1932

1,892,110

UNITED STATES PATENT OFFICE

WYNN MEREDITH, OF OAKLAND, CALIFORNIA

LEVEL VARIATION INDICATING APPARATUS

Application filed August 5, 1929. Serial No. 383,713.

This invention relates generally to apparatus used for indicating departure of a body from a given position, as for example departure from the horizontal. It is of particular value in determining the position of an aeroplane in flight.

It is a general object of this invention to devise an apparatus of the above character which is substantially immune from conditions and forces which might cause an erroneous indication, particularly conditions and forces which are encountered with aeroplanes.

It is a further object of this invention to devise an indicating apparatus utilizing a pair of spaced devices which are responsive to barometric pressure, and which conjointly operate indicating means whereby a relative difference between the levels occupied by the two devices is indicated.

Further objects of the invention will appear from the following description in which I have set forth the preferred embodiment of my invention. It is to be understood that the appended claims are to be accorded a range of equivalents consistent with the state of the prior art.

Referring to the drawing:

Figure 1 is a plan view illustrating an apparatus incorporating the principles of my invention.

Fig. 2 is a diagrammatic cross sectional detail, illustrating one form of indicating means which can be utilized with the apparatus of Fig. 1.

Fig. 3 is a diagrammatic detail taken along the line 3—3 of Fig. 2.

Fig. 4 is a front view of the indicating scale, illustrating the manner in which this scale can be incorporated with the apparatus of Fig. 1.

Fig. 5 is a diagrammatic cross sectional detail, illustrating a modified form of indicating means.

Fig. 6 is a diagrammatic cross sectional detail, illustrating a further modified form of indicating means.

In the past it has been common to determine or indicate a change in the position of a body with respect to the absolute horizontal, by means of devices utilizing the effect of gravity. Examples of such devices are the ordinary bubble tube, and instruments utilizing the movement of a weight or pendulum. Such devices are subject to errors, or may be entirely inoperable, when used under certain conditions. For example when used on aeroplanes to determine or indicate lateral tilting of the plane or to indicate longitudinal inclination of the plane with respect to the horizontal, inertia effect due to varying movements of the plane, and the effect of centrifugal force in making turns, is sufficient to render such instruments impractical. In my invention I have devised an apparatus which is relatively stable in operation, and which will give a practical indication when utilized in conjunction with an aeroplane.

In place of utilizing the direct effect of gravity to secure an indication, I utilize a pair of spaced devices which are responsive to barometric or atmospheric pressure. Thus referring to the drawing, I have illustrated two barometric devices 11 and 12, which are preferably in the form of aneroid barometers. Thus each device is formed of a sealed cell 13, one wall thereof being formed by a flexible metal diaphragm 14. These devices are shown mounted upon the ends of a tubular casing 16, whereby they are maintained a substantial distance apart.

As is well known, the diaphragm of an aneroid barometer moves according to a change in atmospheric pressure. Assuming that two aneroid barometers are in the same general locality and are substantially identical in construction, the difference between the positions occupied by diaphragms 14 indicates a difference in the height or elevation of the devices. In my invention indicating means is utilized in conjunction with both diaphragms of the devices 11 and 12, thus directly indicating a difference in level. As representative of such means, I have shown a tension wire 17 connecting the centers of diaphragms 14 and 15 of two barometric devices, this wire being preferably extended thru the hollow casing 16. Assuming that the barometric pressure upon diaphragm 14 increases while that upon diaphragm 15 decreases, it is apparent that wire 17 will move longitudinally of casing 16 a certain amount, and this movement is determined by the difference between the barometric pressures.

Movements of wire 17 are employed for operating suitable indicating means. For example as shown in Figs. 2 and 3, I can provide a small mirror 19 mounted upon a suitable pivot pin 21. A cord 22 is shown looped or wound about pivot pin 21 and is secured to wire 17, this cord being normally tensioned by means of spring 23. A suitable means for producing a light beam is indicated at 24, and the light beam from this source is directed upon mirror 19, the reflected beam being caused to fall upon an indicating scale 26. It is apparent that slight longitudinal movements of wire 17 serve to rotate mirror 19, thus shifting the position of the reflected beam upon scale 26. By the use of indicating means of this character, a greatly magnified indication is secured. As is shown more clearly in Figs. 1 and 4, the indicating means described with reference to Figs. 2 and 3 can be enclosed in any suitable housing 27, interposed at an intermediate portion of casing 16, and this housing can be provided with a visual scale 28, corresponding to the scale 26 of Fig. 2.

With respect to the mode of operation of my device, it is apparent that when one or the other of the two devices 11 or 12 is raised to an elevation greater than the other device, by tilting the casing 16, the barometric pressures upon the two devices will vary accordingly, and wire 17 will be moved a certain amount relative to casing 16. This movement, and the new position assumed by wire 17, can be noted by the observer by virtue of the movement of the light beam on scale 28, and the new position assumed.

Under certain conditions of operations, as for example when used in conjunction with aeroplanes, centrifugal force is developed by virtue of the masses of the diaphragms 14 and 15, and of wire 17, may seriously affect the indication secured. In order to render the apparatus immune from the effect of centrifugal force, I preferably utilize a counterweight 29 in conjunction with each diaphragm 14 and 15. These counterweights can be connected to wire 17 by means of pivoted lever arms 31. The masses of counterweights 29 and the leverage afforded by arms 31 are preferably sufficient to produce a force tending to substantially counterbalance centrifugal forces upon either or both of the diaphragms 14 and 15, and upon the wire 17.

Generally the casing 16 is many feet in length in order to secure a sensitive indication. Since this casing is preferably made of ordinary metals, such as copper, brass or aluminum, its expansion or contraction according to the temperature changes may seriously affect the indication secured, unless proper compensating means is afforded. Therefore I preferably form the wire 17 either of the same metal as is employed for the casing 16, or the material of the wire has substantially the same coefficient of expansion as the metal of casing 16. Therefore when changes in temperature occur, both the casing and the wire 17 are expanded or contracted an equal amount, thus nullifying any effect upon the indicating means.

I prefer that both ends of the casing 16 adjacent devices 11 and 12 be in communication with the atmosphere, and therefore I provide openings 32. By means of such openings, I obviate affecting the indication by surges of the air column enclosed by casing 16. Such surges may occur thru sudden changes in movement or by centrifugal force.

Modified forms of indicating means have been illustrated diagrammatically in Fig. 5. Thus I have shown a condenser bridge formed by the stator plates 33 and 34, and a movable plate 36. Plate 36 is carried by pivot pin 21, similar to that shown in Figs. 2 and 3. Upon movement of wire 17 plate 36 is caused to change its relative positioning with respect to plates 33 and 34, so as to indicate its capacitative relationship to one plate, and decrease its capacitance with respect to the other plate. A bridge type electron relay amplifier 37, is connected to plates 33 and 34, and also to movable plate 36 by means of conductor 38. Electron relay amplifiers of this character are well known in the art, and need not be described in detail. Oscillator 39 is imposed in conductor 38 for continually impressing a varying potential of relatively high frequency upon the condenser plates. The output of amplifier 37 is utilized for operating an indicating device 40. Indicating device 40 will of course show a neutral position for the intermediate or neutral position of the plate 36, but will depart from this neutral position upon movement of plate 36 toward plate 33 or plate 34.

Another modification of my invention is shown in Fig. 6. In this case in place of having the reflected light beam of Fig. 2, directed upon visual scale 28, this light beam is directed upon photoelectric cells 41, 42 and 43. These cells are arranged to control the input of electron relay amplifiers 44, 45 and 46, and the outputs of these amplifiers in turn serve to operate indicating lamps 47, 48 and 49. When casing 16 is in horizontal position and devices 11 and 12 are on the same level, the reflected light beam falls upon photoelectric cell 42, and lamp 48 is illuminated. However when casing 16 deviates from the horizontal of position by a certain amount, the reflected light beam falls upon either photoelectric cell 41 or 43, thus causing lamp 48 to be extinguished and one or the other of lamps 47 or 49 to be illuminated.

When my device is utilized in conjunction with an aeroplane, devices 11 and 12 are positioned in remote points of the plane, and the indicating device is in any position from which it can be readily observed by the pilot. For example devices 11 and 12 can be near the tips of the aeroplane wings, so that the pilot can determine if the aeroplane is horizontal or is tilted to one side or the other. Instead of or in addition to having the devices upon the wings of the plane, one device can be placed forwardly of the fuselage and the other device near the rear or tail of the plane, in order to determine when the fuselage is directed upwardly or downwardly.

I claim:

1. In apparatus of the character described, a pair of barometric pressure responsive devices spaced a substantial distance apart, indicating means, and means for causing said devices to act upon said indicating means in opposition, whereby an indication is afforded of the difference in barometric pressures on said devices.

2. In apparatus of the character described, a pair of barometric pressure responsive devices spaced a substantial distance apart, each device including a member movable responsive to a change in barometric pressure upon the same, means for mechanically connecting the movable members of said devices in opposition, whereby said members are constrained to move in unison and in accordance with the difference in barometric pressures on said devices, and means for indicating movements of said members.

3. In apparatus of the character described, a pair of spaced barometric pressure responsive devices adapted to be mounted upon a common movable support, and indicating means controlled by both said devices to indicate the difference in barometric pressures on said devices, said devices being spaced a sufficient distance apart to secure an indication responsive to tilting of said support.

4. Means for indicating departure from a given level comprising a pair of barometers each having a member movable responsive to a change in barometric pressure, said barometers being spaced apart a substantial distance, means mechanically connecting said members whereby said members can move only when a differential pressure exists on the two devices, and means for indicating movements of said members.

5. Means for indicating departure from a given level comprising a pair of spaced barometers each having a flexible diaphragm, a tensioned wire connecting said diaphragms whereby said diaphragms act in opposition for like changes in barometric pressures on said devices, and means for indicating movements of said wire responsive to a differential between the barometric pressures on said devices.

6. Means for indicating departure from a given level comprising a pair of spaced barometers each having a flexible diaphragm, a tensioned wire connecting said diaphragms whereby said diaphragms act in opposition for like changes in barometric pressures on said devices, means for indicating movements of said wire responsive to a differential between the barometric pressures on said devices, and means for counterbalancing the masses of said diaphragm and wire to render the apparatus immune to centrifugal forces.

In testimony whereof, I have hereunto set my hand.

WYNN MEREDITH.